United States Patent [19]
Matsubara et al.

[11] Patent Number: 4,796,575
[45] Date of Patent: Jan. 10, 1989

[54] WEAR RESISTANT SLIDE MEMBER MADE OF IRON-BASE SINTERED ALLOY

[75] Inventors: Toshihiko Matsubara, Kawagoe; Akira Fujiwara, Tokyo, both of Japan

[73] Assignee: Honda Giken Kogyo Kabushiki Kaisha, Tokyo, Japan

[21] Appl. No.: 111,253

[22] Filed: Oct. 22, 1987

[30] Foreign Application Priority Data

Oct. 22, 1986 [JP] Japan ................. 61-249441
Oct. 22, 1986 [JP] Japan ................. 61-249442

[51] Int. Cl.$^4$ .............................. F01L 1/18; F01L 1/04
[52] U.S. Cl. .................... 123/90.44; 123/90.39; 123/90.6; 75/230; 75/236; 419/17; 419/29; 419/47; 428/564
[58] Field of Search ............... 123/90.39, 90.41, 90.44, 123/90.6; 74/567, 519, 559; 75/230, 236, 239, 240, 241, 243; 419/10, 14, 15, 17, 18, 23, 29, 38, 47; 420/8, 12, 34; 428/553, 564, 565

[56] References Cited

U.S. PATENT DOCUMENTS

| | | | |
|---|---|---|---|
| 4,119,459 | 10/1978 | Ekemar et al. | 75/243 |
| 4,243,414 | 1/1981 | Takahashi et al. | 419/47 X |
| 4,436,062 | 3/1984 | Nakakobara et al. | 123/90.44 X |
| 4,485,770 | 12/1984 | Saka et al. | 123/90.39 |
| 4,524,046 | 6/1985 | Suganuma et al. | 419/47 X |
| 4,556,533 | 12/1985 | Oaku et al. | 419/38 X |
| 4,561,889 | 12/1985 | Oaku et al. | 419/38 X |
| 4,583,502 | 4/1986 | Takahashi et al. | 123/90.39 |
| 4,623,595 | 11/1986 | Futamura et al. | 428/553 |
| 4,632,074 | 12/1986 | Takahashi et al. | 123/90.39 |
| 4,648,903 | 3/1987 | Ikenoue et al. | 75/230 |

FOREIGN PATENT DOCUMENTS

0007003 2/1984 Japan .
0063350 4/1985 Japan .
0005650 8/1985 Japan .

*Primary Examiner*—Willis R. Wolfe
*Attorney, Agent, or Firm*—Birch, Stewart, Kolasch & Birch

[57] ABSTRACT

A wear resistant slide member made of iron-base sintered alloy in which carbides are dispersed in a matrix phase. 80% or more of the carbides contained in an alloy metallurgical structure are 4~15 μm in sized, the carbides are dispersed at an average grain interval of 5~15 μm, and a field-of-view occupation area proportion of the carbides is 10~15%. If this slide member is used in slide contact with a second slide member made of iron-base alloy whose slide surface layer is subjected to remelt-hardening treatment by means of high-density energy irradiation, amounts of abrasion of the both slide members are sufficiently small, and excellent durability as a combination of slide members for use in a power machine, can be revealed.

5 Claims, 6 Drawing Sheets

WEAR RESISTANT SLIDE MEMBER MADE OF IRON-BASE SINTERED ALLOY

BACKGROUND OF THE INVENTION

The present invention relates to a wear resistant slide member made of iron-base sintered alloy coming into slide contact with one another under a large surface pressure.

In a valve moving mechanism of an internal combustion engine, members such as a rocket arm (its anti-cam slide surface portion) held in slide contact with a cam, a valve lifter, and the like are required to have excellent wear resistance called abrasion-resistance hereinafter.

In the prior art, these members were provided as members made of forged steel, cast steel, alloyed cast iron and the like with their contact surfaces with a cam subjected to surface hardening by heat treatment, carburizing and quenching treatment, chill hardening, hard-Cr-plating, etc.

However, carburized and quenched members are poor in anti-scuffing property (note: "scuffing" means that phenomenon that coagulation between frictional surfaces is remarkable and thereby surface nature becomes rough), chill-hardened members are poor in durability, hard-Cr-plated members may generate peeling caused by local contact or abrasive peeling, and thus the known members respectively involve problems.

With regard to a cam shaft, heretofore, cam shafts made of cast iron (for example, made of JIS FC 25~30 material or made of alloyed cast iron) have been widely used, and the procedures have been employed such that upon casting, a chilled layer is formed along a cam surface by making use of a chilling block, or that after casting, a slide contact surface portion forming a cam actuating surface is subjected to remelt-hardening treatment (after molten by flame or by high-frequency heating, cooled by itself) and thereby a chilled layer is formed.

Recently, however, due to the fact that accompanying realization of high speed and high output power of internal combustion engines, a slide surface pressure on a cam surface is increased and hence high abrasion-resistance as compared to the prior art is required, even if a chilled layer is formed along a cam surface portion of a cam shaft upon casting, sufficient abrasion resistance cannot be obtained, the abrasion resistance cannot be said to be fully satisfactory.

On the other hand, with regard to a rocker arm held in slide contact with a cam, carburized and quenched members are poor in anti-scuffing property, chill-hardened members are poor in durability, and hard-Cr-plated members may generate peeling caused by local contact or abrasive peeling, as stated above.

Moreover, abrasion accompanying slide contact between a cam and a rocker arm depends upon a combination of materials of the respective members, and how to select the combination is a difficult problem. As a member satisfying this requirement, anti-cam slide members formed of iron-base sintered alloys have been proposed, and in these alloys various factors such as size, amount (field-of-view occupation area proportion), etc. of carbides dispersed in a base phase (matrix phase) and influencing hardness are defined, and improvements in abrasion-resistance and anti-scuffing property were contemplated while suppressing abrasion of a cam (for instance, refer to Japanese Patent Publication No. 59-7003 (1984), Laid-Open Japanese Patent Specification No. 60-63350 (1985) and Laid-Open Japanese Patent specification No. 60-155650 (1985)).

However, according to the understanding of various factors with respect to carbides in the iron-base sintered alloys in the prior art, the construction of the entire metallurgical structure is not clear, and so, it is not always possible to attain the desired object.

SUMMARY OF THE INVENTION

The present invention has been worked out under the above-described technical background, and one object of the invention is to provide a wear resistant slide member made of iron-base sintered alloy whose desired material properties are guaranteed by defining a dispersed state of carbides in a metallurgical structure.

Another object of the present invention is to provide an optimum combination of slide members subjected to little abrasion.

According to the present invention, the former object is attained by providing a wear resistant slide member made of iron-base sintered alloy having carbides dispersed in a matrix phase, in which 80% or more of the carbides contained in the alloy metallurgical structure have grain sizes of 4~15 $\mu$m, the carbides are dispersed at an average grain interval of 5~15 $\mu$m, and a field-of-view occupation area proportion of the carbides is 10~50%.

The latter object is attained by providing a combination of a first slide member having at least its slide surface layer formed as a metallurgical structure in which hard material phases are dispersed in a base phase, and a second slide member made of iron base metal to be held in slide contact with the first slide member, characterized, in that 80% or more of the hard material phases dispersed in the base phase of the first slide member at an average grain interval of 5~15 $\mu$m and with a field-of-view occupation area proportion of 10~50% are occupied by grains of 4~15 $\mu$m in size, and the second slide member has its slide surface layer subjected to remelt-hardening treatment by means of highdensity energy irradiation.

DETAILED DESCRIPTION OF THE PREFERRED EMBODIMENTS

The technique of improving abrasion-resistance of metallic materials jointly with strengthening of a base phase by dispersing hard material phases in the base phase, has been heretofore known, and it is possible to achieve improvement in abrasion-resistance of a slide member made of the metallic material and also suppress abrasion of an opposed member held in contact therewith as much as possible by varying the size and amount of the hard material phases to be dispersed. However, in practice, only defining the size and amount of the hard material phases is not sufficient, but characteristics of a material are determined only after the dispersed state of the hard material phases also have been defined.

According to results of experiments conducted by the inventors of this invention, it has been proved that effective defining factors with respect to hard material phases are sizes (grain diameters), amounts (field-of-view occupation area proportions) and grain intervals. Here, it is to be noted that by merely defining these factors, they cannot be defined in an inherent mean, and a method for measuring and existing state of hard material phases must be clearly defined.

The method of measurement employed by the inventors is as follows:

(1) Sizes (grain diameters) of hard material phases:

A cutting method in JIS-G-0552 "Method of Testing Ferrite Crystal Grain Sizes in Steel" was applied. A cut cross-section surface of a specimen is ground and polished, then it is corroded, and the corroded surface is observed by means of a microscope or its microscope photograph is taken. From a number and a sum of lengths of carbides grains cut by two orthogonal line segments having a predetermined length, an average grain diameter is calculated by the following formula:

$$\frac{\text{[Sum of lengths of respective grains cut by line segments]}}{\text{[Number of grains]}} = $$

[Average grain diameter]

It is to be noted that for hard material grains positioned at the opposite ends of a line segment and cut only partly, only one of them is counted, and in the case where an only partly cut grain exists only at one end of a line segment, this grain is not counted. In addition, a magnification of a microscope is selected so that a number of hard material grains cut by one line segment may amount at least 10 in one field of view, and measurement is effected for a plurality of fields of view so that a total of the numbers may amount to 50 or more.

Figure 1:
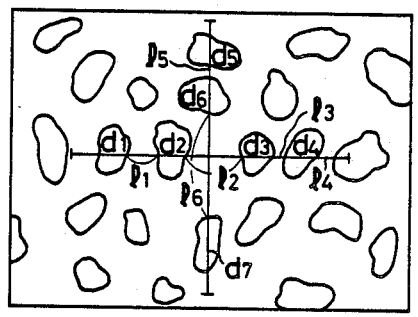
FIG. 1 is an illustration of a method for measuring an average grain diameter of carbides contained in an alloy base phase.

Example of measurement:

With reference to FIG. 1, the average grain diameter is as follows:

$$[\text{Average grain diameter}] = \frac{d_1 + d_2 + \ldots + d_7}{7}$$

(2) Average grain interval of hard material phases:

Similarly to paragraph (1) above, an average of interval lengths between adjacent hard material grains cut by two orthogonal line segments having a predetermined length, is calculated by the following formula:

$$\frac{\text{[Sum of interval lengths between grains]}}{\text{[Number of grains]}} = $$

[Average grain interval]

It is to be noted that in the case where opposite end portions of a line segment respectively partly cut hard material grains, with respect to only one of the hard material grains the interval length between that grain and the adjacent grain is taken into account, but in the case where only one end portion of a line segment partly cut a hard material grain, the interval length between that grain and the adjacent grain is not taken into account. In addition, a magnification of a microscope is selected so that a number of intervals between adjacent hard material grains cut by one line segment may amount to at least 10 in one field of view, and measurement is effected for a plurality of fields of view so that a total of the numbers may amount to 50 or more.

Example of Measurement:

With reference to FIG. 1, the average grain interval is as follows:

$$[\text{Average grain interval}] = \frac{l_1 + l_2 + \ldots + l_6}{5}$$

Figure 2:
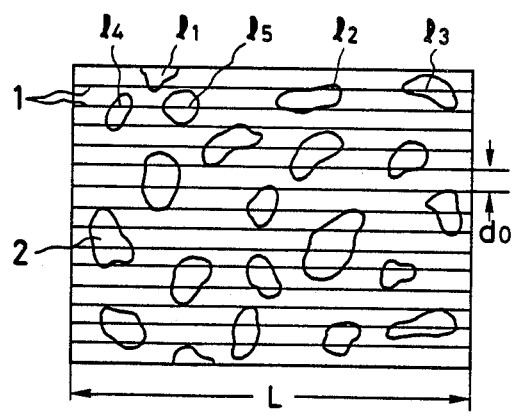
FIG. 2 is an illustration of a method for measuring an average distance between grains of carbides in an alloy base phase.

(3) Amount (field-of-view occupation area proportion):

A cut cross-section surface of a specimen is ground and polished, then it is corroded, and the corroded surface is microscope-photographed. Then, a field-of-view occupation area proportion is calculated through a line segment method as shown in FIG. 2.

A rectangular field of view having a predetermined area is selected, then parallel scanning lines 1 are drawn at a predetermined interval length (do) that is matched with hard material grain sizes, lengths of line segments overlapping the respective hard material grains 2 are represented by $l_1, l_2, \ldots, l_n$, and the length of the scanning lines 1 is represented by L. Then, the field-of-view occupation area proportion is calculated by the following formula:

$$\frac{(l_1 + l_2 + \ldots + l_n) \times do \text{ (total area of hard material particles)}}{L \times do \times (m + 1) \text{ (Area of a field of view)}} = $$

[field-of-view occupation area proportion]

(where m represents a number of scanning lines)

It is to be noted that this technique can be executed also by making use of a pattern analyzer.

Figure 9:
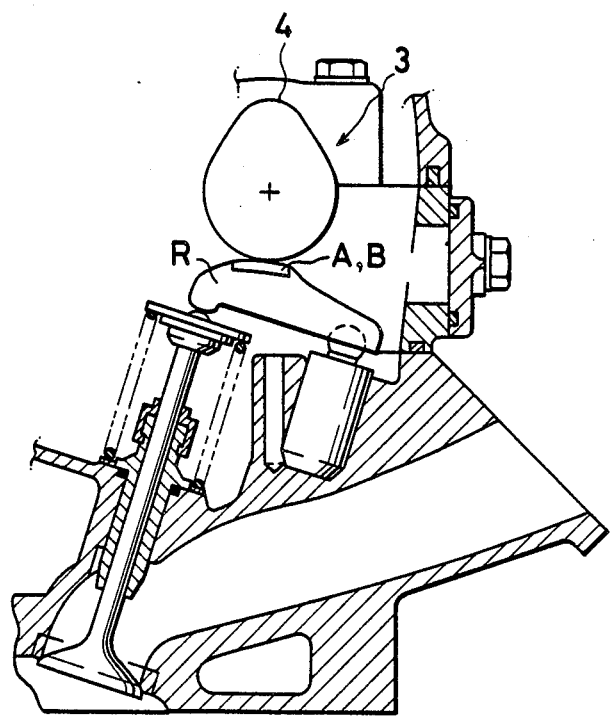
FIG. 9 shows an essential part of an overhead cam shaft type valve moving mechanism is an internal combustion engine, in relation to test examples of the present invention.

Test Examples:

Contact pieces A and B (FIG. 9) to be attached to an anti-cam slide contact surface portion of a rocker arm R (FIG. 9) (herein after called anti-cam slide contact piece) and a cam 3 (FIGS. 3, 4 and 9) were prepared through the following processes (1) and (2):

(1) A target composition of the anti-cam slide contact piece was selected to be

| C | 2.5% | Cr | 17.0% |

| | -continued | | |
|---|---|---|---|
| Mo | 3.0% | W | 0.13% |
| V | 0.15% | Mn | 0.3% |
| Si | 0.8% | P | 0.25% |
| Ni | 3.0% | Fe | the remainder |
| (every one of them is represented in weight %) | | | |

Fe-C-Cr-Mo-W-V-Mn-Si alloy powder containing 250~350 mesh powder by 15~25 volume % was added with powders of C, Fe-Ni Alloy and Fe-P alloy, and after they were mixed and presshaped, the shaped piece was sintered in a vacuum furnace under the conditions of 1195° C. in temperature and 60 minutes in time.

Next, after the sintered piece was brazed onto an anti-cam slide contact surface portion of a rocker arm, it was subjected to carburizing-quenching and annealing, and after it was ground and polished, an anti-cam slide contact piece A was obtained.

In addition, after the sintered piece was brazed onto an anti-cam slide contact surface portion of a rocker arm, it was subjected to carburizing-quenching and annealing, and after it was ground and polished, it was further subjected to salt bath soft nitriding treatment (580° C. in temperature, 70 minutes in time), and thereby an anti-cam slide contact piece B was obtained.

In the anti-cam slide contact piece A, a hardness of the base phase was HV 600~900, a hardness of the carbides was HV 1,000~1,300, and a density was 7.65~7.70 g/cm$^3$.

Furthermore, when the state of existence of the carbides in the slide member was checked through the above-described method of measurement, an average grain diameter of 4.5 μm, an average grain interval of 11 μm and a field-of-view occupation area proportion of 30% were measured.

It is to be noted that the slide member obtained through sintering and heat treatment includes hard metal carbides dispersed in the base phase and a diffused layer produced by salt bath soft nitriding treatment of martensite and bainite, thereby improvements in the abrasion-resistance of the slide member itself can be achieved, and also by appropriately selecting the kind, amount, size and dispersed state of the carbides, abrasion of a cam forming an opposed member can be reduced.

The reasons why the respective elements are added, are as follows:

Cr strengthens a base phase, also it reacts with C and forms hard carbide, and thereby abrasion-resistance is improved. However, if the amount of addition is less than 5 weight %, a desired effect cannot be expected, while if it is added by more than 30 weight %, it becomes liable to abrade the opposed cam, hence an overall abrasion amount becomes large, and besides, disadvantages would occur such that sintering property is remarkably deteriorated and the like.

Mo strengthens a base phase similarly to Cr, also reacts with C and forms hard carbide, and thereby abrasion-resistance is improved. However, if the amount of addition is less than 1 weight %, a desired effect cannot be obtained, while if it is added by more than 5 weight %, brittleness of the material would result.

W and V both react with C, and hard carbides of MC type (where M represents a symbol of metallic element) are formed, which carbides contribute to improvements in abrasion-resistance. Unless an amount of addition of at least one of these additive components is 0.1 weight % or more, a desired effect cannot be obtained, while if the amount of addition exceeds 4 weight %, cutting property is degraded and it becomes liable to abrade an opposed member.

Sn is solved in solid as dispersed in a base phase, and it is effective for suppressing austenitizing due to Ni. If the amount of addition is less than 0.2 weight %, an effect of addition is not recognized, while if Sn is added by more than 5 weight %, the carbide grains would become coarse, resulting in degradation of a mechanical strength, and hence an abrasion-resistance is deteriorated.

Ni strengthens a base phase and prevents carbides from dropping off. In addition, Ni has the effects of improving sintering property and enhancing affinity with an opposed cam. Furthermore, if Ni is added by more than 5 weight % without being accompanied with Sn, austenite phases would be produced in the base phase and an abrasion-resistance would be lowered, but if the content of Si is in the above-described range, with an amount of addition of Ni of 5.5~10 weight % good abrasion-resistance is revealed.

C strengthen a base phase, and also reacts with Cr and other additive components, resulting in precipitation of hard material phases, and thereby abrasion-resistance is improved. However, if the amount of addition is less than 1 weight %, a desired effect cannot be obtained, while if it exceeds 4 weight %, lowering of toughness would result.

P and B have the effect of promoting sintering, these are elements making a sintered member have a high density, and addition of at least one of them suffices. If the amount of addition is less than 0.05 weight %, a desired effect cannot be obtained, and if they are added by more than 5 weight %, surplus liquid phase is produce upon sintering, and hence a dimension variation rate becomes unfavorably large.

Figure 3:
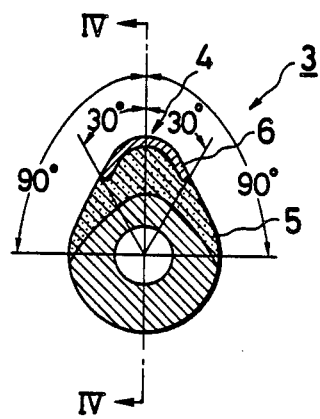
FIG. 3 is a cross-section view of a cam made of cast iron having its surface subjected to remelt-hardening treatment.
Figure 4:
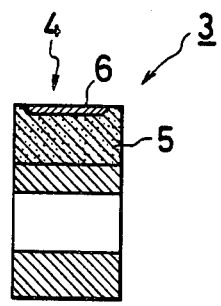
FIG. 4 is another cross-section view of the same taken along line IV—IV in FIG. 3.

(2) A cam made of JIS G5501-FC30 (gray cast iron) was prepared. This cam is partly chilled in the angular range of +90 degrees on the both sides of a cam nose, and a surface layer of the same cam in the angular range of +30 degrees on the both sides of the cam nose was subjected to quick remelting treatment of 1 mm in depth by means of a plasma torch, then after 1.5 weight % of Cr powder and 1 weight % of Mo powder were added to its molten pool, it was quenched by self cooling. The obtained cam 3 is shown in FIGS. 3 and 4 (in these figures, reference numeral 4 denotes a cam nose, numeral 5 denotes a chilled layer, and numeral 6 denotes a remelt-hardening treated layer). Hardness of the chilled layer·5 was H$_R$C45, and hardness of the remelt-hardening treated layer 6 was H$_R$C60.

It is to be noted that the Cr powder and the Mo powder added to the molten pool during the remelt-hardening treatment are carbide stabilizing elements, and besides, V and Nb have similar functions. These elements can be added in the form of their respective simple substance powders, alloy powders therebetween or powders of their compounds with C or the like. However, if the amount of addition of the carbide stabilizing elements is less than 0.5 weight %, the amount of carbides in the remelt-hardening treated layer becomes small and hence great improvement of the abrasion-resistance cannot be expected, while in the case where an amount exceeding 4 weight % is added also, the improving effect for abrasion-resistance is small, and the addition becomes economically disadvantageous.

Figure 5:
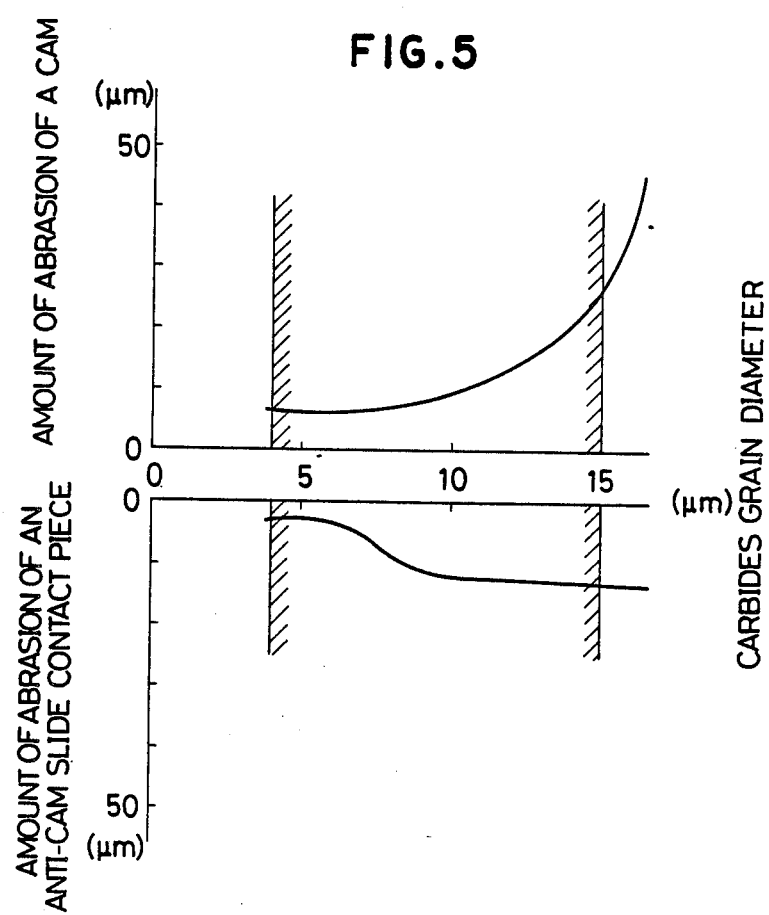
FIG. 5 is a diagram showing relations between an average grain diameter of carbides and amounts of abrasion of a cam and an anti-cam slide contact piece A.
Figure 6:
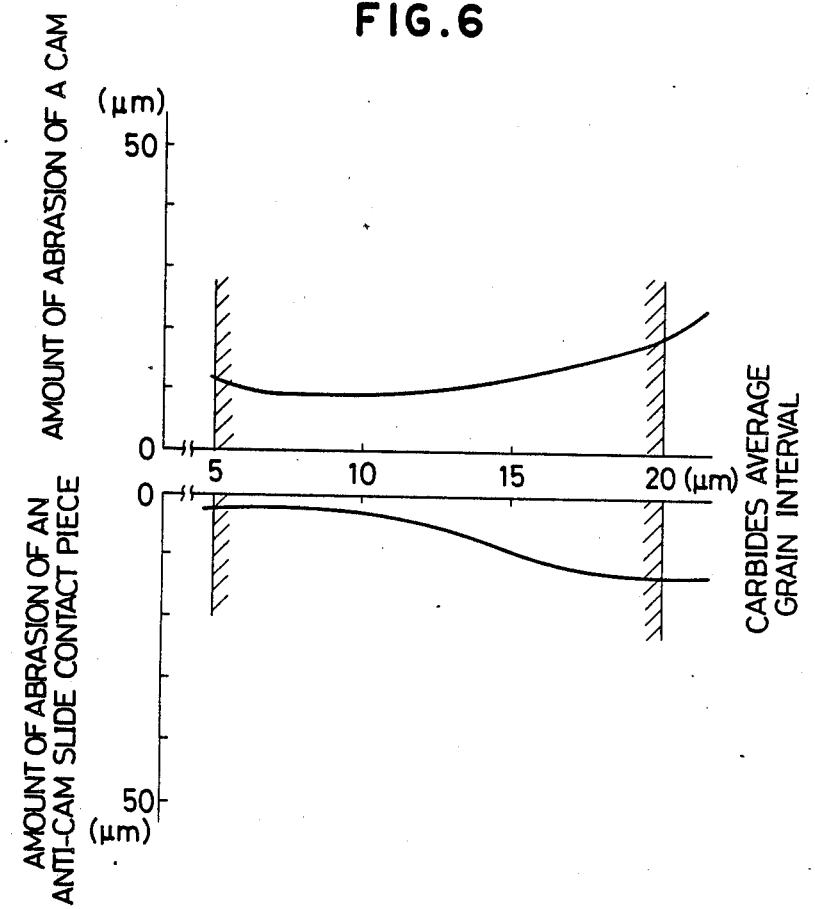
FIG. 6 is a diagram showing relations between an average grain interval of carbides and amounts of a abrasion of a cam and an anti-cam slide contact piece A.
Figure 7:
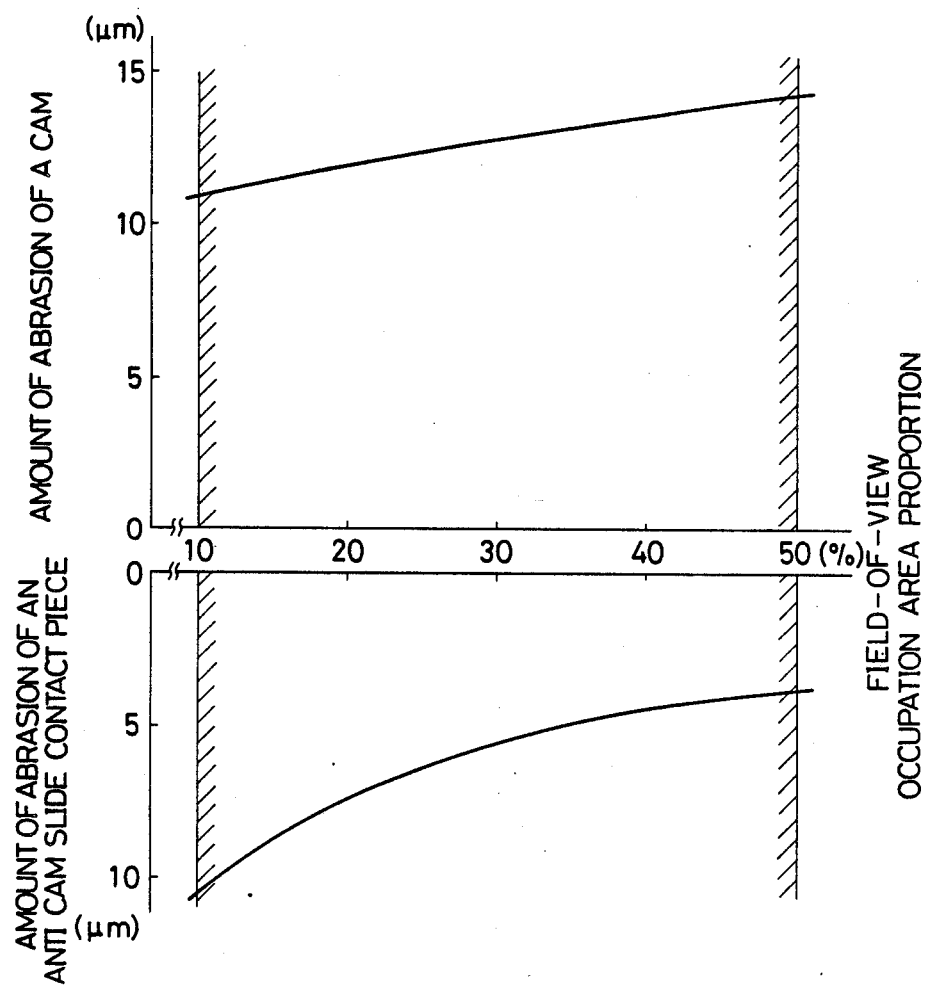
FIG. 7 is a diagram showing relations between a field-of-view occupation area proportion of carbides and amounts of abrasion of a cam and an anti-cam slide contact piece A.

(3) A plurality of cams 3 obtained through the process described in the preceding section (2) were used, a plurality of anti-cam slide contact pieces A obtained through a process similar to that described in the preceding section (1) in which existing states of carbides are different, were prepared, the respective anti-cam slide contact piece A and cam were assembled in internal combustion engines, the engines were operated at 2000 rpm for 300 hours, amounts of abrasion of an anti-cam slide contact piece and a cam were investigated for each combination, and the results are shown in FIGS. 5 to 7.

Figure 8:
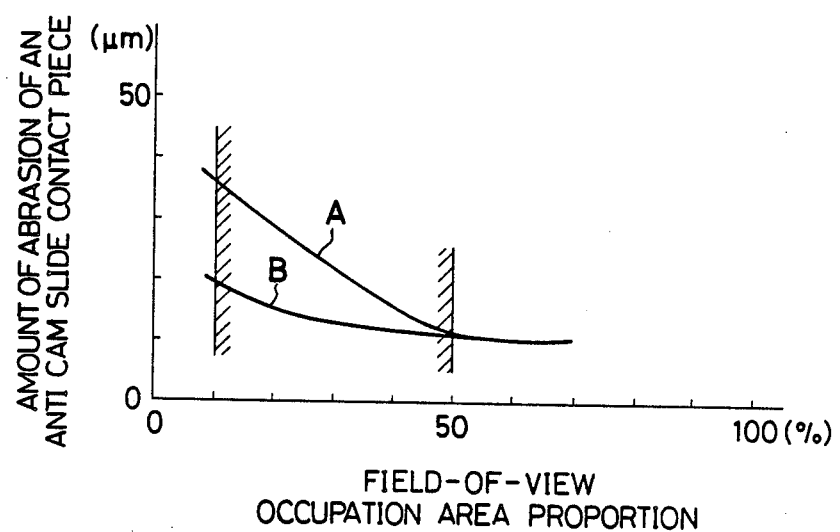
FIG. 8 is a diagram showing relations between a field-of-view occupation area proportion of carbides and amounts of abrasion of anti-cam slide contact pieces A and B.

With respect to the anti-cam slide contact pieces B, similarly they are assembled in internal combustion engines, the engines were operated at 6000 rpm for 400 hours, amounts of abrasion of an anti-cam slide contact piece and a cam were investigated for each combination, and the results are shown as compared to the amounts of abrasion of the anti-cam slide contact pieces A in FIG. 8.

(4) FIG. 5 shows the influence of grain diameters of carbides contained in a metallurgical structure of an anti-cam slide contact piece A exerted upon an amount of abrasion.

With reference to FIG. 5, if an average grain diameter of carbides exceeds 15 $\mu$m, an amount of abrasion of a cam increases abruptly, but with respect to an average grain diameter of 4 $\mu$m or less, measurement of such grain diameters is difficult, and in this diameter range, there is a tendency that an amount of abrasion of a cam increases. Also, an amount of abrasion of an anti-cam slide contact piece A tends to somewhat increase if an average grain diameter of carbides exceeds 6 $\mu$m, but the amount of abrasion is almost constant.

Therefore, it is desirable to select the range of average grain diameter of 4~15 $\mu$m for which an amount of abrasion of a cam is 7~27 $\mu$m and an amount of abrasion of an anti-cam slide contact piece A is 6~17 $\mu$m, and if more than 80% of carbides have a grain diameter of 4~15 $\mu$m, the average grain diameter falls in that range.

(5) FIG. 6 shows influence of an average grain interval of carbides contained in a metallurgical structure of an anti-cam slide contact piece A exerted upon an amount of abrasion.

With reference to FIG. 6, if an average grain interval of carbides exceeds 15 $\mu$m, an amount of abrasion of an anti-cam slide contact piece A increases, while if an average grain interval exceeds 20 $\mu$m, an amount of abrasion of a cam increases and a scuffing phenomenon would arise.

In addition, if an average grain interval is less than 5 $\mu$m, a strength of a base phase in an anti-cam slide contact piece A is lowered, resulting in generation of cracks, and an amount of abrasion of a cam also tends to increase.

Therefore, it is desirable to select the range of average grain interval of 5~15 $\mu$m for which an amount of abrasion of a cam is 9~19 $\mu$m and an amount of abrasion of an anti-cam slide contact piece is 5~16 $\mu$m, and a more desirable average grain interval is 5~12 $\mu$m.

(6) FIG. 7 shows influence of a field-of-view occupation area proportion of carbides contained in a metallurgical structure of an anti-cam slide contact piece A exerted upon an amount of abrasion, and FIG. 8 comparatively shows relations between a field-of-view occupation area proportion of carbides and slide members (the respective anti-cam slide contact pieces A and B).

With reference to FIGS. 7 and 8, it is seen that as a field-of-view occupation area proportion is increased, an amount of abrasion of a cam increases in a nearly linear manner and an amount of abrasion of an anti-cam slide contact piece decreases in a nearly linear manner. In addition, if a field-of-view occupation area proportion exceeds 50%, despite of an increase of abrasion of a cam, an amount of abrasion of an anti-cam slide contact piece almost does not vary and cracks are liable to occur, and therefore, it is desirable to select a field-of-view occupation area proportion to be not greater than 50%. And, since the effect of carbides cannot be expected if a field-of-view occupation area proportion is less than 10%, a field-of-view occupation area proportion should be selected to be 10% or more.

Therefore, it is desirable to select the range of field-of-view occupation area proportion of 10~50% for which an amount of abrasion of a cam is 12~14.4 $\mu$m and an amount of abrasion of a anti-cam slide contact piece is 3.7~11 $\mu$m.

Furthermore, by carrying out salt bath soft nitriding treatment, an amount of abrasion can be further reduced.

As will be apparent from the above description, a wear resistant slide member made of iron-base sintered alloy, in which 80% or more of carbides contained in a metallurgical structure of the alloy have sizes of 4~15 $\mu$m, the carbides being dispersed at an average grain interval of 5~15 $\mu$m, and a field-of-view occupation area proportion of the carbides is 10~50%, has been proposed.

With the slide member having the above-mentioned metallurgical structure, since the size, amount and dispersed state of the carbides which influence an abrasion-resistance of the member are defined at optimum values determined experimentally, amounts of abrasion of the slide member and an opposed member coming into slide contact therewith are sufficiently small, and hence, excellent durability as a slide member in a power machine can be revealed.

In addition, a combination of slide members consisting of a first slide member in which at least a slide surface layer thereof is formed so as to have a metallurgical structure including hard material phases dispersed in a base phase, and a second slide member made of iron base metal to be held in slide contact with the first slide member, characterized in that 80% or more of the hard material phases dispersed in the base phase of the first slide member at an average grain interval of 5~15 $\mu$m and in a field-of-view occupation area proportion of 10~50% are occupied by grains of 4~15 $\mu$m in size, and the second slide member is subjected to remelt-hardening treatment by means of high-density energy irradiation, has been proposed.

With the above-described combination of slide members, since the size, amount and dispersed state of the hard material phases contained in the metallurgical structure of the first slide member, to improve an abrasion-resistance of the first slide member and also to influence an amount of abrasion of the second slide member, are defined at optimum values determined experimentally amounts of abrasion of the both slide members are sufficiently small, and so, excellent durability as a combination of slide members for use in a power machine can be revealed.

What is claimed is:

1. A wear resistant slide member made of iron-base sintered alloy, in which carbides are dispersed in a matrix phase; characterized in that 80% or more of the carbides contained in an alloy metallurgical structure have grain sizes of 4~15 μm, said carbides are dispersed at an average grain interval of 5~15 μm, and a field-of-view occupation area proportion of the carbides is 10~50%.

2. A combination of slide members consisting of a first slide member in which at least a slide surface layer thereof is formed so as to have a metallurgical structure including hard material phases dispersed in a base phase, and a second slide member made of iron-base metal to be held in slide contact with the first slide member; characterized in that 80% or more of the hard material phases are grains of 4~15 μm in size which are dispersed at an average grain interval of 5~15 μm in a field-of-view occupation area proportion of 10~50%, and the second slide member is subjected to remelt-hardening treatment by means of high-density energy irradiation.

3. A combination of slide members as claimed in claim 2, characterized in that when the remelt-hardening treatment is carried out, at least one kind of carbides stabilizing element selected from a group consisting of Cr, Mo, V and Nb is forcibly added to the slide surface layer of said second slide member.

4. A combination of slide members as claimed in claim 2 characterized in that said first slide member is a wear resistant piece attached onto an anti-cam slide contact surface of a rocker arm used in a valve moving mechanism of an internal combustion engine, and said second slide member is a cam paired with said wear resistant piece.

5. A combination of slide members as claimed in claim 3 characterized in that said first slide member is a wear resistant piece attached onto an anti-cam slide contact surface of a rocker arm used in a valve moving mechanism of an internal combustion engine, and said second slide member is a cam paired with said piece.

* * * * *